United States Patent [19]

Charles et al.

[11] 3,972,577

[45] Aug. 3, 1976

[54] ISOBARIC DEVICE WITH ROTATING ELECTRICAL CONTACTS

[75] Inventors: Joel Marie Charles, La Valette; Jean-Pierre Maurice Ghiglione, La Crau, both of France

[73] Assignee: Etat Francais represented by Delegation Ministerielle pour l'Armement, France

[22] Filed: Sept. 15, 1975

[21] Appl. No.: 613,195

[30] Foreign Application Priority Data

Sept. 23, 1974 France .............................. 74.31946

[52] U.S. Cl. .............................. 339/5 L; 339/8 L; 339/117 R
[51] Int. Cl.² ....................................... H01R 39/00
[58] Field of Search ............ 339/5 L, 5 M, 5 R, 2 R, 339/8 L, 117 R, 117 P, 118 R, 118 RY

[56] References Cited
UNITED STATES PATENTS 3,295,091  12/1966  Mossin .............................. 339/5 R Primary Examiner—Roy Lake
Assistant Examiner—DeWalden W. Jones
Attorney, Agent, or Firm—Stevens, Davis, Miller & Mosher

[57] ABSTRACT

An isobaric device housing rotating electrical contacts, including a water-tight housing filled with an electrically insulating liquid at a pressure which is substantially the same as the pressure of the environment in which the device is to be used, and one or more rotating electrical contacts formed by concentric conductive collars located between pairs of insulating rings, which rings are separated and sealed by sealing joints of elastomeric material, the space defined between said rings, collars and sealing joints being filled with an electrically conductive liquid, and washers on each outer end of the contact structure limiting axial movement of the sealing joints which joints also transmit pressure. A plurality of such contact structures may be stacked together on a common shaft thereby forming a multi-contact device. A process for manufacturing such contacts is also disclosed.

13 Claims, 3 Drawing Figures

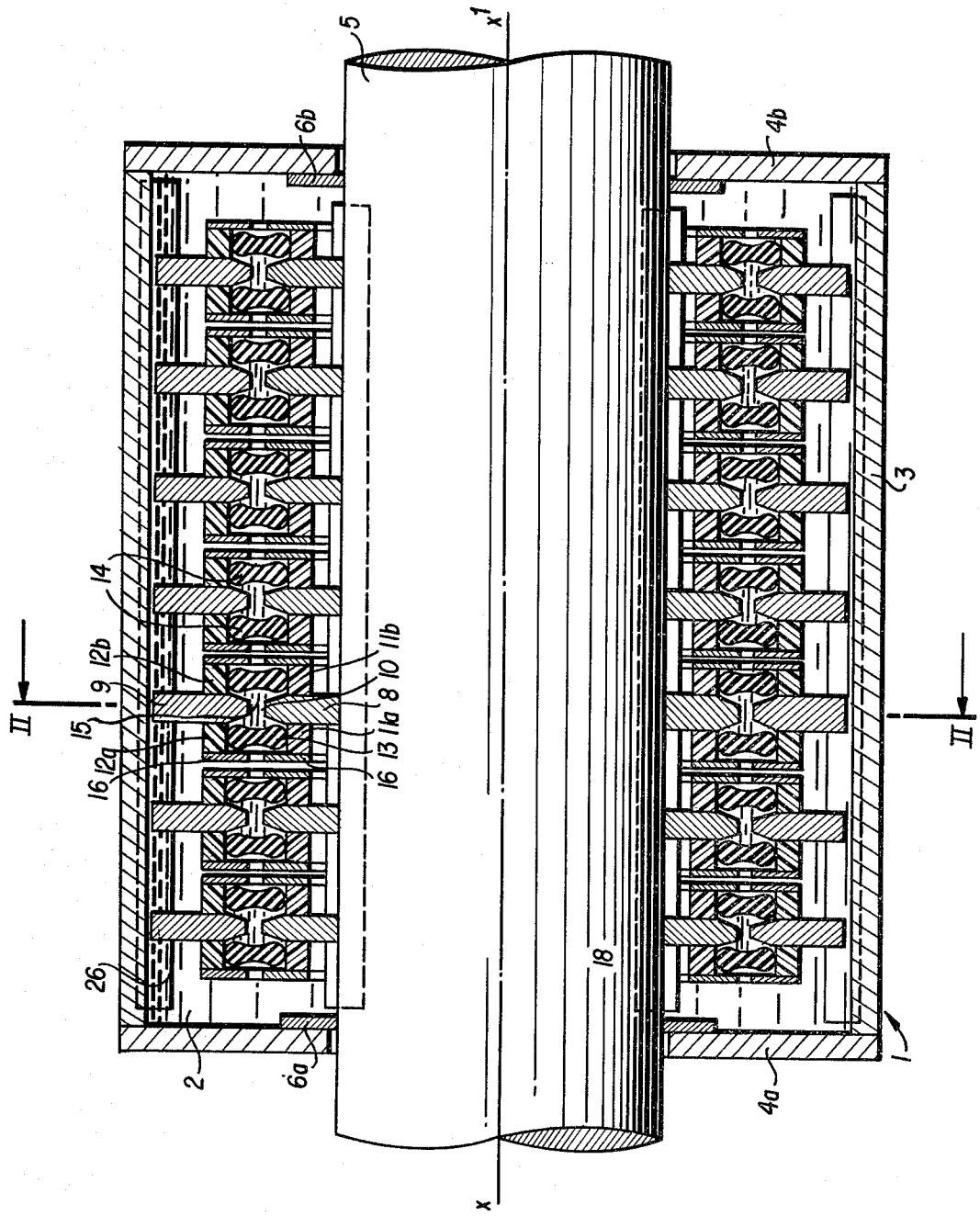

ISOBARIC DEVICE WITH ROTATING ELECTRICAL CONTACTS

The object of the present invention is an isobaric device with rotating electrical contacts intended to establish one or more electrical contacts between conductors rotating around an axis and conductors which are stationary with respect to said axis. A device in accordance with the invention is intended to be used on apparatus submerged under water or other media at great depth and subjected to a high hydrostatic pressure.

The technical field of the invention is that of the construction of submerged apparatus, for instance rotary antennae of panoramic sonars intended to operate at great depth.

The construction of devices with rotating electrical contacts which take up little space and can withstand very high pressures, for instance pressures of the order of 100 bars, raises very difficult problems.

Up to now it has been attempted to solve these difficulties by placing the rotating contact devices within pressure-resistant water-tight housings.

This solution results in the necessity of constructing housings which are heavy and large so that they can withstand high pressures. Moreover it is necessary to provide a water tight joint at the place of passage of the rotating shaft through the wall of the housing.

Another solution includes placing the rotating-contact device in a housing filled with a liquid which is under the same pressure as the ambient medium. This liquid in which the assembly of the device is bathed must be a good electrical insulator, for instance a mineral oil. This second solution makes it possible to reduce the dimensions of the rotating-contact devices but the known isobaric devices have draw-backs.

They are usually formed of stationary brushes which rub against rotating collars. The liquid forms an insulating film between the brushes and the collars so that the passage of current is interrupted. Moreover electric arcs are produced between the brushes and the collars, and the insulating liquid decomposes upon contact by these arcs giving rise to conductive carbon.

The object of the present invention is to provide an isobaric rotating-contact device which is capable of withstanding high hydrostatic pressures, while eliminating the drawbacks of the previously known isobaric devices.

This object is achieved by means of a device composed of a water-tight housing filled with an insulating liquid at the same pressure as the ambient environment, and containing the pair of concentric conductive collars one of which is rotatable the other being fixed, which are also separated by a small interval. Each pair of collars is accompanied by pairs of annular insulating rings fixed on the side faces of each collar and a pair of sealing joints arranged between said rings, which joint together with said rings and the said collars define a closed annular space which is filled with a conductive liquid under the same pressure as the said insulating liquid.

The conductive liquid is preferably a liquid metal, such as mercury or a liquid metal alloy, such as an alloy of gallium and indium.

A liquid metal or metal alloy is preferably chosen due to the high conductivity of said liquids. However, this choice results in difficulties since it is known that liquid metals are very agressive with respect to most materials.

In accordance with one feature of the invention, the conductive metal collars are preferably molybdenum or tungsten which stand up well to contact with liquid metals.

The insulating rings, placed in contact with the conductive liquid are preferably glass, ceramic or polytetrafluoroethylene (teflon) which readily withstand contact with a liquid metal.

Insulating rings of glass, assembled directly by fritting with molybdenum conductive collars, are preferably employed. This solution has the advantage of eliminating any binder between the insulating rings and the conductive collars since it is difficult to find a binder which readily withstands contact with a liquid metal.

The result of the invention is a new product constituting a rotating electrical contact.

The device in accordance with the invention is isobaric with the ambient medium, and may therefore be submerged to a very great depth.

This result is obtained without necessarily constructing a housing or joint which must withstand the hydrostatic pressure while eliminating any risk of false contact due to the presence of an insulating liquid between the conductive surfaces.

The device in accordance with the invention has the advantage of permitting the construction of compact multi-contact devices by stacking in the same housing identical elements each comprising a pair of conductive collars, one turning and the other stationary. This advantage is particularly interesting for apparatus used in submarine acoustics, for instance for the production of rotating antennae of panoramic sonars, which require a rotating electrical connection comprising multiple contacts.

Another advantage of this arrangement of the invention resides in the fact that it is possible to house a motor in the interior of the arrangement for rotating the rotatable part.

The following description refers to the accompanying drawings which show one embodiment of the invention by way of illustration and not of limitation.

FIG. 1 is a longitudinal section through a device in accordance with the invention.

Figure 3:
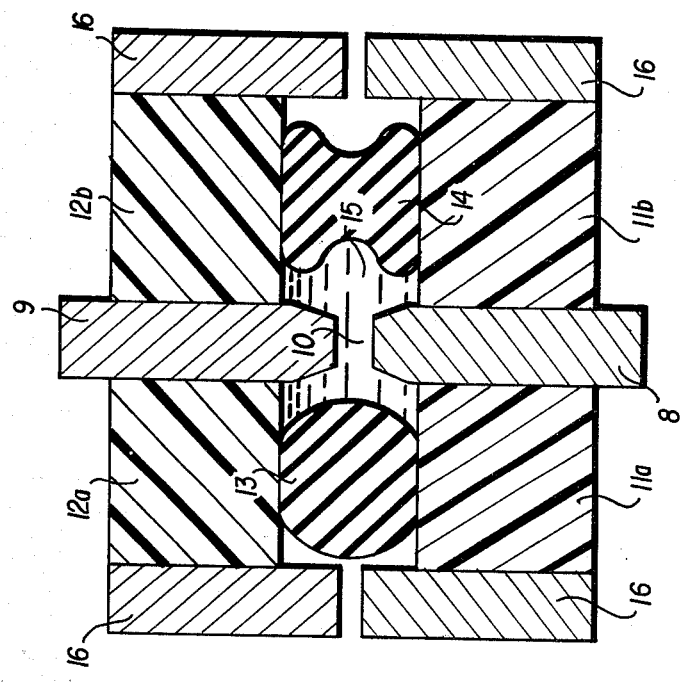
FIG. 3 is a view on a larger scale.

FIG. 1 shows a rotating contact device placed within a water-tight housing filled with an electrically insulating liquid 2. The housing is composed of a cylindrical body 3 having axis $x\,x^1$, closed at its two ends by covers 4a and 4b. A shaft 5, driven in rotation, penetrates into the housing. Sealing joints 6a and 6b are arranged around the passage of the shaft 5 through the covers 4a and 4b. These joints assure a seal between the inside and outside of the housing while transmitting the hydrostatic pressure so that the liquid 2 is in pressure equilibrium with the outside of the housing, particularly when the housing is immersed. The housing 1 and the joints 6 therefore do not have to resist great hydrostatic pressures.

The device in accordance with the invention is a multi-contact device composed of identical elements stacked in contact with each other. For example, in the case shown in the figure, there are seven identical elements. Each element is composed of a pair of concentric collars, the one 8 being driven in rotation by the shaft 5 while the other 9 is fastened to the housing and therefore stationary. The two collars 8 and 9 are separated by a small distance 10. On the side faces of each collar, insulating rings 11a and 11b are fastened on the collar 8 and insulating rings 12a and 12b on the collar 9. Between the rings 11a and 12a which are concentric there is arranged a sealing joint 13. Similarly between the rings 11b and 12b there is arranged a sealing joint 14. The collars 8 and 9, the rings 11a, 11b, 12a and 12b and the joints 13 and 14 define a closed annular space which is filled with an electrically conductive liquid 15. On the outer faces of the rings 11a, 11b, 12a and 12b there are fastened insulating washers 16 which serve as a stop for the joints.

The deformable joints 13 and 14 may move axially in the space 10 and at the same time assure the mechanical centering of the rotating assembly 8, 11a 11b, 16 in the stationary assembly 9, 12a, 12b, 16, the tightness between the liquid 2 and the liquid 15, the transmission of the pressure between the liquid 2 and the liquid 15 so that the liquid 15 is in pressure equilibrium with the outside of the housing via liquid 2. The collars 8 and 9 are bathed in the liquid which assures electrical contact between them during the movement of rotation of the shaft 5. The liquid used is preferably mercury or a liquid alloy of indium and gallium having resistivity of the order of a micro-ohm/cm.

The collars 8 and 9 are molybdenum or tungsten which readily withstand contact with the liquid metals. The insulating rings 11a, 11b, 12a and 12b are glass, ceramic, polytetrafluoroethylene or other similar plastic materials which readily withstand contact with a liquid metal.

The collars 8 and 9 are preferably of molybdenum and the rings 11a, 11b, 12a and 12b are glass fritted directly on the molybdenum rings. The joints 13 and 14 are of an elastomer, which is resistant to contact with liquid metal, for instance polytetrafluoroethylene.

The washers 16 are not placed in contact with the liquid metal and may therefore be made of any material and fastened to the rings 11 and 12 by gluing.

Figure 2:
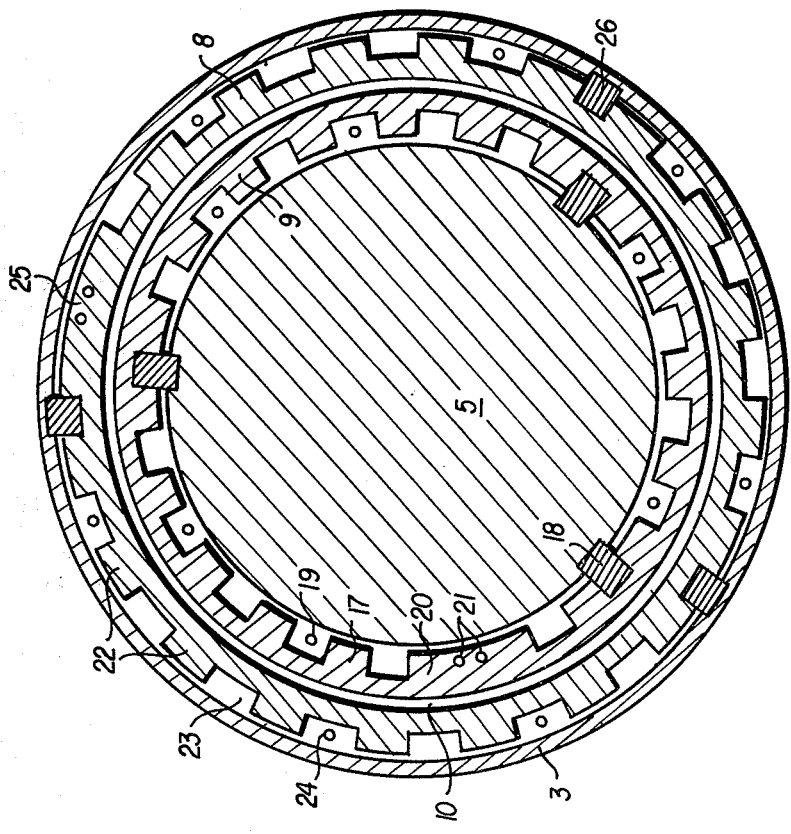
FIG. 2 is a transverse section along the line II-II of FIG. 1.

FIG. 2 shows, in cross section, the shaft 5, a pair of collars 8 and 9 separated by a space 10, and the side wall 3 of the housing.

The collars 8 bear on their inner periphery equidistant protrusions 17 having the shape of crenellations. These protrusions define notches, in three of which there are embedded keys 18 which are also embedded in grooves provided at the periphery of the shaft 5 and which make the collars 8 integral in rotation with the shaft 5. The notches of the different collars are superimposed and form longitudinal channels through which there extend the conductors 19 leading to the successive collars 8.

Each collar has a protrusion 20 whose width is equal to three times the width of a normal protrusion and which closes a channel. The corresponding conductor is connected to the connecting terminals 21 borne by its protrusion. These connecting protrusions are spaced angularly apart from one collar to the next.

Likewise, the outer collars 9 are provided on their outer periphery with protrusions 22 which define notches 23 having the shape of crenellations. These notches are superimposed defining longitudinal channels in which there are placed the conductors 24 which are connected to widened protrusions 25. Bars 26 are embedded in three of the longitudinal channels and in grooves provided on the inner periphery of the housing 3 in order to center the collars.

In order to avoid oxidation of the liquid metal alloy or metal 16, the latter is poured into its housing operating in a vacuum enclosure. The collars 8 and 9 are placed horizontally, the lower joint, for instance the joint 14, being in place. The annular cavity defined by the collars and the insulating rings are filled with conductive liquid 15 and the upper joint is then put in place, for instance the joint 13, and thereupon the stops 16 for this joint. The different unit contacts are prepared in this manner under vacuum before they are assembled together in their desired number in order to form a multicontact device.

FIG. 3 is a view on a larger scale showing a rotating collar 8, a stationary collar 9, the insulation collars 11a, 11b, 12a, 12b, the stop washers of the joint 16 and the joints 13 and 14. This figure shows by way of example a toroidal joint 13 and a joint 14 in the form of a ring with flattened edges, which shape is known as a quadring.

These shapes of joints are preferred shapes which impart good stability to the joints.

Of course, various parts of the examples described can be replaced by equivalent parts well known to those skilled in the art without thereby going beyond the scope of the invention.

We claim:
1. An isobaric device housing a rotating electrical contact, comprising a sealed, water-tight housing filled with an electrically insulating liquid at a pressure which is substantially the same as the pressure of the environment in which the device is to be used, a rotating electrical contact comprising a pair of coaxial concentric electrically conducting collars, one of which is rotatable, the other being fixed, which collars are separated by a closed annular space filled with an electrically conductive liquid, wherein each pair of electrically conductive collars is sandwiched between two pairs of insulating rings and further between a pair of sealing joints of an elastomeric material one of which is located radially between each of said pairs of insulating rings, and joints, rings and collars together defining the closed annular space filled with electrically conductive liquid, said joints also serving as means for maintaining said conductive liquid at the same pressure as said insulating liquid.

2. The device of claim 1, wherein said insulating rings are glass, and one of said rings is fused to each axial face of each of said collars.

3. The device of claim 2, wherein said collars are of a material selected from the group consisting of molybdenum or tungsten.

4. The device of claim 1, wherein said electrically conductive liquid is a liquid metal selected from the group consisting of mercury or an alloy of gallium and indium.

5. The device of claim 1, additionally comprising a washer located on the opposite side of each ring from the collars, said washers for stopping axial movement of the sealing joints.

6. A multicontact device according to claim 1, wherein there are a plurality of said rotating electrical contacts located adjacent one another on a common rotatable shaft to which the internal collar of each contact is keyed.

7. The multicontact device of claim 6, wherein there are notches on the radially inner surface of the inner collars and on the radially outer surface of the outer collars, which notches are respectively axially aligned forming channels for receiving electrical conductors for making electrical connection with each of said collars.

8. The device of claim 6, wherein said insulating rings are glass, and one of said rings is fused to each axial face of each of said collars.

9. The device of claim 6, wherein said collars are of a material selected from the group consisting of molybdenum or tungsten.

10. The device of claim 6, wherein said electrically conductive liquid is a liquid metal selected from the group consisting of mercury or an alloy of gallium and indium.

11. A process for manufacturing a rotating electrical contact, comprising placing a first set of two concentric washers on a horizontal surface and placing coaxially on top of those washers a pair of concentric electrically conductive collars, each of which has an insulating ring fused to each axial face thereof, and an elastomeric sealing joint located radially between the insulating rings on the axial faces of said collars which face said first set of washers, filling electrically conductive liquid metal into the space defined between said joint, rings and collars, placing a second elastomeric sealing joint radially between the insulating rings on the other axial faces of said collars, and placing a second set of two concentric washers over said second joint, said washers being coaxial with the first set, the collars and joints.

12. The process of claim 11, wherein said liquid metal is filled into said space under non-oxidizing conditions.

13. A process for manufacturing devices including a multiplicity of rotating electrical contacts, comprising manufacturing a plurality of rotating electrical contacts by the process of claim 11, and then stacking a plurality of such contacts adjacent each other on a common rotatable shaft, and keying the internal collar of each rotating contact to said shaft.

* * * * *